(12) United States Patent
Monteyne

(10) Patent No.: US 6,488,737 B1
(45) Date of Patent: Dec. 3, 2002

(54) METHOD FOR REDUCING METALLIC OXIDES

(75) Inventor: Guido Monteyne, Lembeke (BE)

(73) Assignee: Sidmar N.V., Gent (BE)

( * ) Notice: Subject to any disclaimer, the term of this patent is extended or adjusted under 35 U.S.C. 154(b) by 0 days.

(21) Appl. No.: 09/698,076

(22) Filed: Oct. 30, 2000

Related U.S. Application Data

(63) Continuation of application No. PCT/EP99/02749, filed on Apr. 23, 1999.

(30) Foreign Application Priority Data

Apr. 28, 1998 (EP) ............................................. 98870097

(51) Int. Cl.⁷ ............................................... C21B 13/08
(52) U.S. Cl. .......................................... 75/414; 75/484
(58) Field of Search .................................... 75/484, 414

(56) References Cited

U.S. PATENT DOCUMENTS

| | | | |
|---|---|---|---|
| 3,770,417 A | | 11/1973 | Kranz |
| 5,567,224 A | | 10/1996 | Kranz |
| 5,951,740 A | * | 9/1999 | Sarma et al. ................. 75/484 |
| 5,989,019 A | * | 11/1999 | Nishimura et al. ........... 75/484 |

FOREIGN PATENT DOCUMENTS

| | | |
|---|---|---|
| FR | 556.633 | 7/1923 |
| JP | 410030106 | * 2/1998 |

OTHER PUBLICATIONS

Steel Times, May 1997; pp. 191 and 192; "Metal Recovery from Steel Wastes by the INMETCO Process", by Stefano Barozzi.

Steel Times, Nov. 1996, p. 399; "The Comet Process—DRI from Fines and Coal".

LU 60 981, (Societe Anonyme Des Minerais) Jun. 24, 1971.

* cited by examiner

*Primary Examiner*—Melvyn Andrews
(74) *Attorney, Agent, or Firm*—Oblon, Spivak, McClelland, Maier & Neustadt, P.C.

(57) ABSTRACT

A method for the reduction of metallic oxides and a rotating-hearth furnace. The method is for the reduction of metallic oxides in a furnace with a ring-shaped rotating hearth in which a carbonaceous reducing agent and metallic oxides are deposited in a strip on a part of the rotating hearth and are then transported in a roughly helical movement to a discharge device. The reducing agent is preheated and mixed with the preheated metallic oxides before and/or during their deposition on the rotating hearth. In a first reducing stage, the volatile components of the carbonaceous reducing agent (mainly methane and hydrogen) are used to initiate the reduction of the metallic oxides and, in a second reducing stage, carbon monoxide is used. The rotating-hearth furnace is subdivided into a charging zone, at least one intermediate zone adjacent to the charging zone, and a discharge zone adjacent to the intermediate zone.

31 Claims, 3 Drawing Sheets

METHOD FOR REDUCING METALLIC OXIDES

This application is a continuation of application Int'l PCT/EP99/02749 Filed on Apr. 23, 1999.

BACKGROUND OF THE INVENTION

1. Field of the Invention

The present invention relates to a method for reducing metallic oxides, particularly iron oxides, and to a device for implementing the method.

2. Discussion of the Background

The direct reduction of metallic oxides, particularly ores but also various metallic oxides to be recycled, has developed considerably in recent years.

A method is described in the document LU-60981-A (Société Anonyme des Minerais) for producing an iron sponge comprising the use of a continuous rotating-hearth reactor with a displacement of the material from the side to the centre, first supplied with coal and then, after the coal has been coked, with iron ore, in pellet form or broken up, preheated to the reaction temperature. Fixed scrapers cause a movement of the coal towards the centre of the furnace and mix the coked coal with the ore as the rotating hearth rotates. After the reaction, the charge is discharged through a central shaft.

One of the disadvantages of the present state of the art is that the volatile constituents of the coal do not take part in the reduction of the metallic oxides. This method does not make it possible to obtain either a high productivity or a high degree of uniformity as regards the temperature and the material of the charge.

SUMMARY OF THE INVENTION

The objective of the present invention is to propose a method for reducing metallic oxides making a more efficient use of the reducing capacities of the volatile constituents of a carbonaceous reducing agent.

In conformity with the invention, this objective is attained by a method for the reduction of metallic oxides in a furnace with a ring-shaped rotating hearth in which a carbonaceous reducing agent and metallic oxides are deposited in a strip on a part of the said rotating hearth and are then transported in a roughly helical movement to a discharge device, characterised in that the reducing agent is preheated and mixed with the preheated metallic oxides before or during their deposition on the rotating hearth, in that, in a first reducing stage, the volatile components of the carbonaceous reducing agent (mainly methane and hydrogen) are used to initiate the reduction of the metallic oxides and in that, in a second reducing stage, carbon monoxide is used.

Unlike the methods in the present state of the art, the method according to the invention uses a part of the volatile constituents of the carbonaceous reducing agent, particularly methane and hydrogen, for their reducing capacity.

The method according to the invention makes it possible to increase the reaction rates by a mixing of the metallic oxides and the carbonaceous reducing agent by efficient use of the reducing capacities of the volatile constituents of the carbonaceous reducing agent by their forced passage through the preheated mixture that forms the furnace charge.

One of the advantages of this method lies in the fact that the volatile components, i.e. the distillation gases from the carbonaceous reducing agent, are used in a first stage to reduce the metallic oxides, whereas in known methods these gases are burnt and are used to heat the solid materials.

The metallic oxides are therefore reduced in two stages or by at least two different chemical reactions.

The first reducing stage is carried out using the hydrogen and/or methane released during the heating of the carbonaceous reducing agent. The reaction kinetics of these reactions are more favourable than those of carbon monoxide at temperatures below 900° C. The aforesaid volatile constituents are progressively released and make contact with the metallic oxides deposited on the furnace hearth under operating conditions, particularly as regards the reaction temperature, such that they participate in the reduction of the said oxides.

The metallic oxides and the reducing gases released make contact at temperatures as high as possible, but without upsetting the progress of the reduction process. The carbonaceous reducing agent is preferably preheated to a temperature up to 200° C., while the metallic oxides are preferably preheated to a temperature up to 850° C.

The two constituents are preferably preheated by means of heat recovered from the combustion gases discharged from the furnace into heat exchangers.

These operating conditions lead to an increase in the production capacity per unit surface area and to a reduction in the quantity of carbon dioxide discharged into the atmosphere per unit quantity of the reduced metallic oxides obtained.

This method also has the advantage of discharging less dust outside the furnace thanks to a control over the speed of these gases while keeping the volume of the furnace to a minimum. The metallic sponge obtained has, in bulk, a better homogeneity in the degree of reduction than products resulting from known techniques.

An excess of at least 10% of carbonaceous reducing agent is preferably used, this excess being defined with respect to the theoretical quantity necessary for the reduction of the oxides.

According to a particular form of execution, a method is proposed for the direct reduction of metallic oxides in a rotating-hearth furnace, in which, on a part called the charging zone of the hearth over a certain width of the ring, which depends on the diameter and the capacity of the furnace, a charge consisting of several layers is deposited. These layers may be deposited simultaneously or successively.

The concentrations of metallic oxides and carbonaceous reducing agent in the layers may be different. Preferably, the concentration of metallic oxides in the upper layers is greater than the concentration of metallic oxides in the lower layers. The lower layers consequently contain an excess of carbonaceous reducing agent. The concentration of carbonaceous reducing agent in the upper layers is therefore less than that in the lower layers. In such a case, there is a kind of gradient in the concentration of metallic oxides, a concentration that increases from the hearth in the direction of the upper surface of the charge. A greater quantity of volatile constituents is therefore released in the deep layers and these gases diffuse through the layers towards the upper surface of the charge, where these volatile constituents encounter a higher concentration of metallic oxides. Since the temperature of the lower layers is lower than the temperature of the upper layers, the volatile constituents of the carbonaceous reducing agent are progressively released in the lower layers and, during their diffusion towards the upper surface, encounter very hot metallic oxides. In fact, the upper layers are hotter than the lower layers, firstly because the upper layers contain a higher concentration of metallic oxides preheated to higher temperatures than the carbonaceous reducing agent and secondly because these layers are in contact with the furnace atmosphere. The volatile constituents therefore participate more effectively in the reduction of the metallic oxides.

Advantageously, the concentration of carbonaceous reducing agent in the lower layer lies between the theoretical concentration necessary for the complete reduction of the metallic oxides and a concentration of 100% by weight, preferably between 30% and 70% by weight and, in particular, preferably between 35% and 60% by weight.

The concentration of carbonaceous reducing agent in the upper layer is preferably less than 25% by weight, and, in particular, is preferably less than 16% by weight.

According to an advantageous form of execution, the charge is heated inside the furnace up to a temperature of 900–1250° C. and preferably 1050–1150° C.

It is worthwhile using the metallic oxides at a feed temperature as high as possible while avoiding the agglomeration of the metallic oxides.

Advantageously, the mixture of carbonaceous reducing agent and metallic oxides, or the charge, is turned over and progressively mixed during its residence inside the furnace.

According to another preferred form of execution, the surface of the charge is shaped by forming furrows or hummocks on it to promote heat exchange between the upper part of the furnace and the charge through an increase in the efficacy of the radiation from the furnace and through an increase in the surface area for heat exchange with the furnace atmosphere.

The slope of the furrows or hummocks normally lies between 40° and 65°.

Preferably, a sawtooth-shaped surface is created on the surface of the charge.

According to a preferred form of execution, the charge or the mixture is charged on to an inner part of the ring-shaped hearth and is transferred in a roughly helical movement towards the outer part of the hearth and, after the reaction, it is discharged through the outer part of the ring.

The mixture is generally discharged after four or more revolutions.

The layer or layers of the mixture of carbonaceous reducing agent and metallic oxides is/are preferably deposited on a part corresponding to ¼ or less of the width of the ring.

During its residence inside the furnace, the bulk density of the charge decreases, i.e. its volume increases. The flow properties of the charge vary and, in particular, the angle of repose increases, i.e. the slope of the hummocks or furrows may become increasingly steep with the progress of the charge inside the rotating-hearth furnace.

According to a preferred form of execution, as the charge is transported from the central part of the rotating hearth towards the outer part, the width occupied by the strip progressively varies during the process. The increase in bulk volume of the charge during the process is largely compensated by an increase in the slope of the sawtooth-shaped surface and in the width of the strip.

A post-combustion of the gases released during the reduction is preferably achieved in the inner part of the furnace ring.

Advantageously, the discharge of the gases and the movement of the charge inside the furnace take place radially in opposite directions.

The reducing agent and the metallic oxides are commonly preheated by means of the heat recovered from the combustion gases and the post-combustion gases.

It appears advantageous to mix some lime with the metallic oxides and/or with the carbonaceous reducing agent, firstly because the said lime acts as a catalyst for the reaction and secondly because it prevents phenomena of adhesion in the metallic sponges. In addition, the lime generally contributes to desulphurisation of pig iron and to the formation of a more fluid slag or clinker.

In a particular application, the layer consisting of the mixture of metallic oxides and carbonaceous reducing agent is formed by a layer of pellets incorporating these constituents.

The term "metallic oxides" embraces both metallic ores, particularly iron ore, and metallic oxides to be recycled originating from iron and steel-making processes and from foundries, for example from blast furnaces, steel plants, electric furnaces or rolling mills, as well as a mixture of these sources of oxides with coke fines or with coal, if necessary in the form of pellets.

The term "carbonaceous reducing agent" is understood to mean any carbonaceous material in solid or liquid form, for example coal, lignite and petroleum derivatives. In general, the reducing agent is coal having a concentration of volatile constituents as high as possible in the context of the process, preferably having a concentration of volatile constituents above 15%.

According to another aspect of the invention, a rotating-hearth furnace for the reduction of metallic oxides is also proposed, the said furnace comprising a ring-shaped rotating hearth subdivided into:

a charging zone,
at least one intermediate zone adjacent to the charging zone,
a discharge zone adjacent to the intermediate zone,
the charging zone comprising a device for depositing, on a strip of the rotating hearth, a charge comprising one or more layers of a mixture of metallic oxides and a reducing agent,
the intermediate zone and possibly the charging zone of the furnace comprising a device for progressively stirring an upper part and an underlying part of the charge while displacing the charge radially as the hearth rotates,
the discharge zone comprising a discharging device enabling the metallised charge to be discharged at one or more discharge points.

The furnace comprises a device for creating on the surface of the deposited layer furrows or hummocks, so as to obtain an essentially sawtooth-shaped surface.

The device for depositing one or more layers of a mixture of metallic oxides and a reducing agent may possibly comprise an apparatus for mixing, while hot, the carbonaceous reducing agent and the metallic oxides before, after or during the deposition of the layers.

According to a particular form of execution, the discharge device comprises a worm conveyor or a deflector. In the case where a deflector is used to carry out the discharge from the furnace, the width of the furnace ring may be greater than when using a worm conveyor, because, in view of the high temperatures prevailing inside the furnace, the worm drive, beyond a certain length, is mechanically too heavily loaded.

The furnace advantageously comprises equipment for stirring comprising rabbles provided with blades arranged like the teeth of a rabble, the said rabbles being fixed and arranged radially in the furnace.

The said rabbles comprise blades penetrating the layer while displacing the mixture radially towards the discharge side of the ring.

The blades are generally offset, i.e. arranged in a slightly staggered fashion with respect to the furrows or hummocks formed by the blades of the preceding rabble, so as to remove or level off one side of each furrow and thus form a new furrow.

According to a preferred form of execution, equipment is provided making it possible, by a first action, to bring down the peaks of the saw teeth, which are the hottest part of the furrows, into the hollows of the furrows and, by a second action, to take one face of each saw tooth on to a face of the adjacent saw tooth so as to cover the material brought by the first action.

The working angle of the blades preferably lies between 20° and 30° with respect to the tangent to the furrows. The working angle of the blades may at any time be adapted in order to reverse the direction of the radial displacement of the charge and in order to increase its residence time inside the furnace.

The blades are preferably shaped so as to turn the charge over.

The furnace advantageously comprises burners installed in the outer walls of the mobile-hearth furnace and/or in the outer ring of the roof in order to maintain the furnace at a temperature of the order of 1200 to 1550° C., preferably of the order of 1400° C.

BRIEF DESCRIPTION OF THE DRAWINGS

The invention will be described in more detail with reference to a preferred form of execution of the invention illustrated in the appended drawings.

DETAILED DESCRIPTION OF THE PREFERRED EMBODIMENTS

Figure 1:
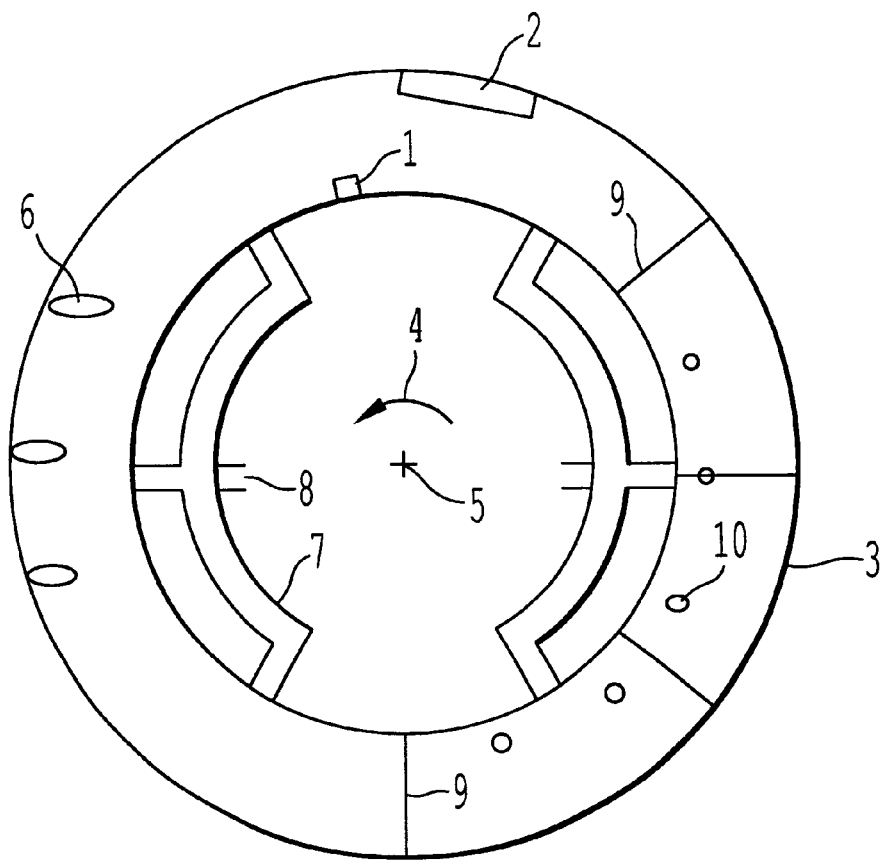
FIG. 1 shows a diagrammatic horizontal projection of a rotary furnace with a distribution of rabbles in a rotary furnace.

The operational principle of the method is illustrated in FIG. 1.

In FIG. 1, the charging zone is illustrated at 1 and the zone for discharge from the rotating hearth 3 is illustrated at 2, the said hearth executing a movement in the counter-clockwise direction represented by the arrow 4 about the furnace axis 5. The burners fixed in the outer wall of the furnace are represented at 6, the combustion gases are extracted through the inner walls of the furnace at 7 and are sent to heat exchangers through 8. The rabbles supporting the blades carry the reference number 9, while the oxygen injectors carry the reference number 10.

Figure 2:
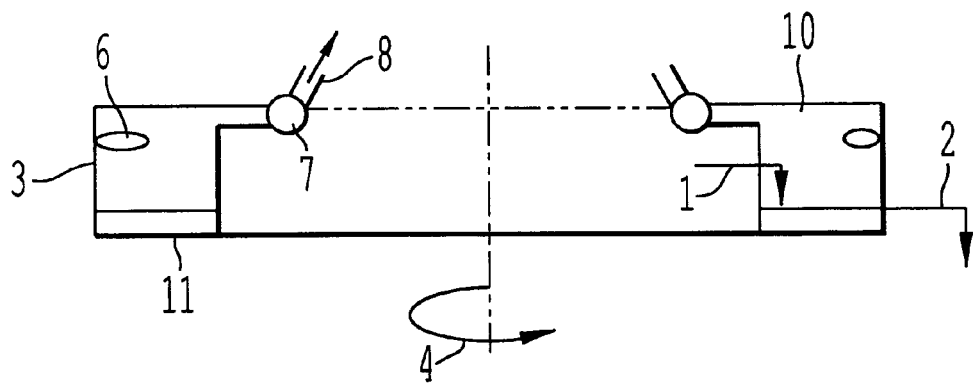
FIG. 2 shows a vertical projection of a section through the rotary furnace.

The same reference numbers as in FIG. 1 are used in FIG. 2. The reference number 11 denotes the charge.

Figure 3:
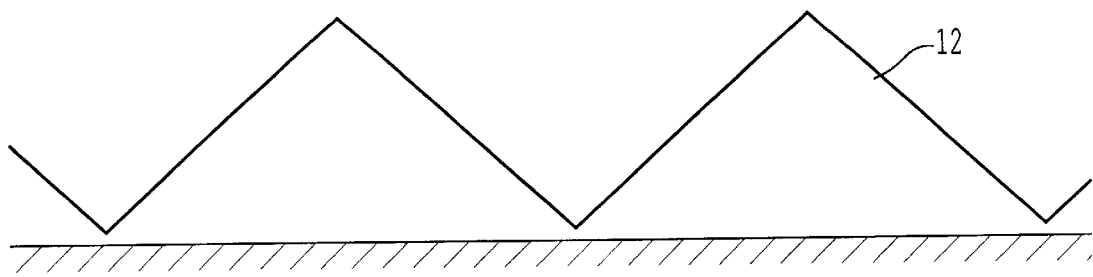
FIG. 3 shows the furrows formed during the charging.

FIG. 3 shows the furrows 12 before the passage of the blades.

Figure 4:
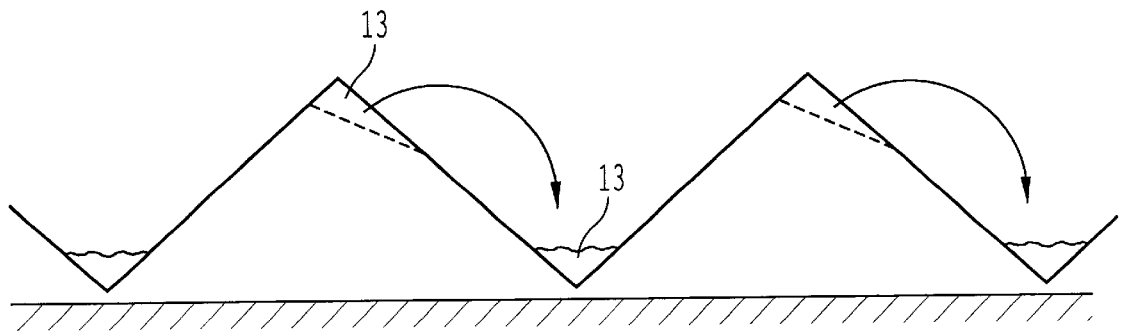
FIG. 4 shows the furrows in the charge resulting from the first action of the blades, located on fixed rabbles.

FIG. 4 shows the levelling off of the peak 13 of the furrows, before the action of the blades.

Figure 5:
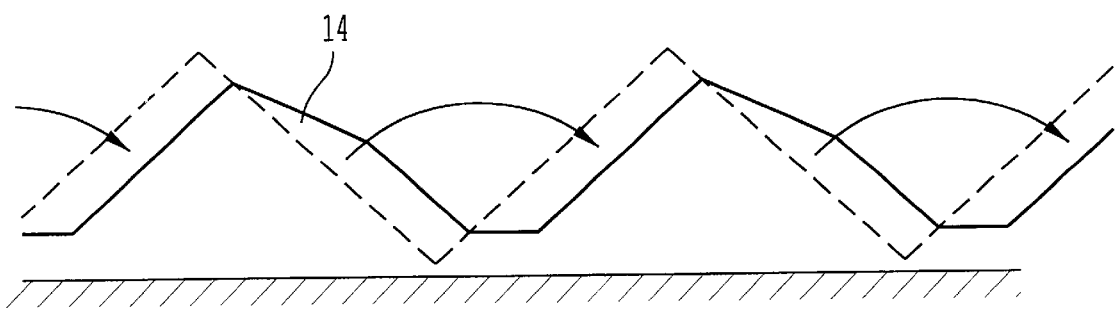
FIG. 5 shows the furrows in the charge resulting from the second action of the blades, located on fixed rabbles.

FIG. 5 shows the levelling off 14 of the furrows resulting from the second action of the blades.

Figure 6:
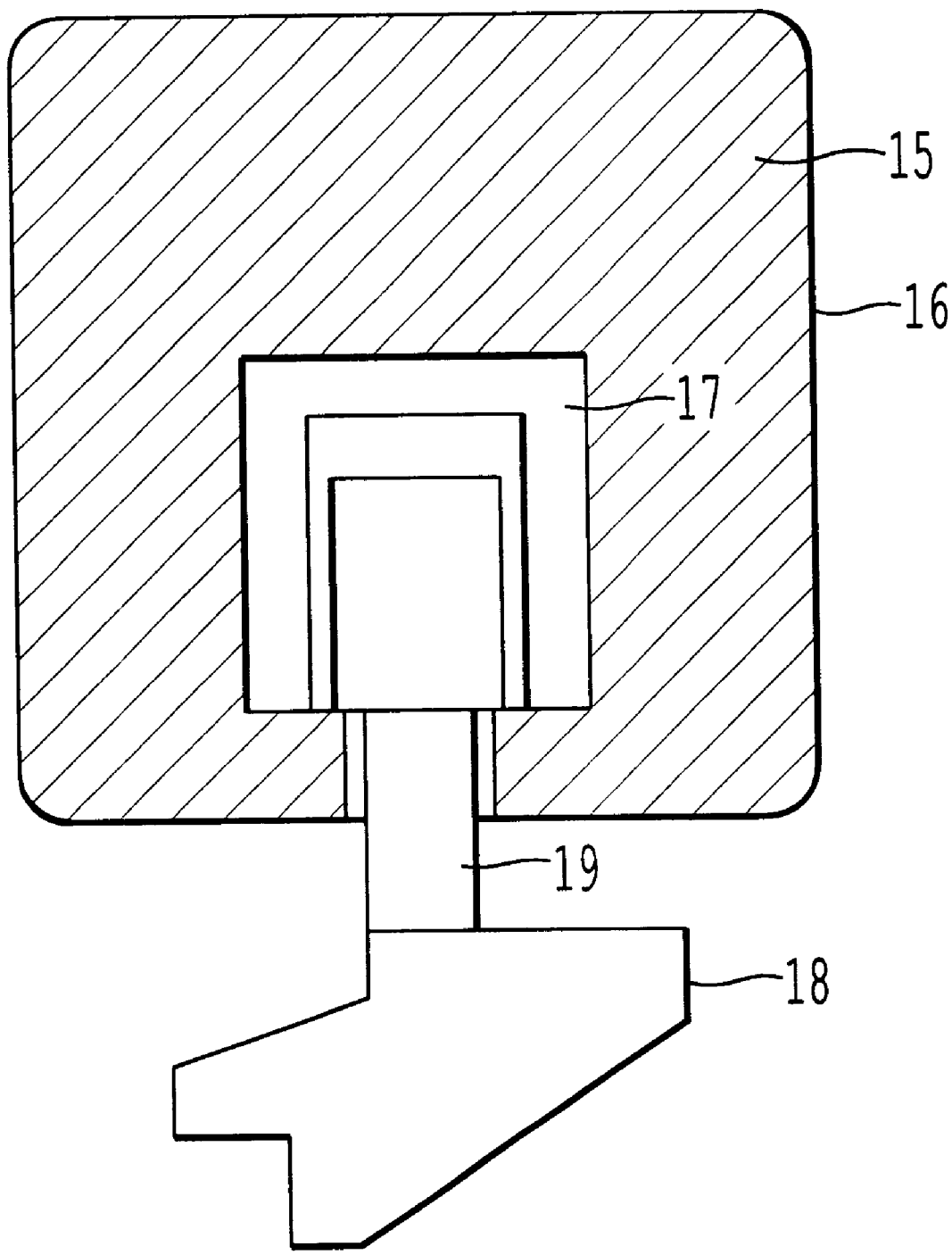
FIG. 6 shows a diagrammatic view of a vertical projection of a section through a rabble and a blade with an arm fixing it to the rabble.

FIG. 6 shows a diagrammatic view of a vertical projection of a section through a rabble 15 with its external thermal insulation 16 and an inner water-cooled chamber 17 together with a blade 18 having an arm 19 fixing it to the rabble.

The action of the dual-action blades is explained in more detail below. The entrance to the furnace is provided with equipment for creating furrows with a triangular cross-section on the surface of the charge so as to obtain a sawtooth-shaped surface. In the intermediate zone forming an extension to the charging zone, the furnace comprises additional dual-action equipment which, by a first action, brings down the material constituting the peak of each saw tooth into the adjacent hollow in order to prevent the material of the peaks, which are very rapidly heated, reaching the temperature of agglomeration and/or the melting point, which would make their mixing with the charge and the reduction of the metallic oxides more difficult. A second action removes one face of each saw tooth and, if necessary, a part of the base, the removed material being taken on to a face of the adjacent saw tooth and covering the material brought by the first action. Consequently, the charge is progressively mixed at increasingly deep levels and is moved radially as the hearth rotates, the base of the saw teeth being moved radially at the end of each revolution of the charge in one or more stages through a total distance corresponding to the width of the charging zone.

In the second intermediate zone that follows, the furnace comprises similar dual-action equipment making it possible, by a first action, to remove the peaks of the saw teeth and to take this part into the adjacent hollow. A second action removes one face of each saw tooth down to the hearth, the removed part being taken on to a face of the adjacent saw tooth, covering the material brought by the first action. The charge is moved radially as the hearth rotates so as to be discharged after several revolutions, preferably after 4 or more revolutions, towards the part of the ring opposite the charging zone.

Of course, the two zones may also comprise identical equipment.

In these intermediate zones of the furnace, the operating conditions are chosen in such a way as to achieve a compromise between, firstly, the need to produce a high and uniform temperature of the charge as quickly as possible and, secondly, the need to put progressively into contact with the layer of metallic oxides or the upper layer of the mixture of metallic oxides and coal only the upper part of the underlying layer, avoiding incorporating in it the cooler lower layers, so that the temperature of the new mixture thus formed is above 600° C., in particular is of the order of 700° C. to 800° C.

The rotational speed of the hearth is chosen as a function of the furnace diameter. It may lie between 3 and 16 revolutions per hour and is preferably between 8 and 12 revolutions per hour.

The speed of the charge relative to the blades preferably lies between 10 and 50 cm/s and is advantageously between 15 and 30 cm/s.

Moreover, as regards the upper layer of the charge, it is essential to avoid this being vitrified, for example by the formation of silicates of the fayalite type that have an inhibiting effect on the reduction. For this purpose, means such as rabbles ensure a rapid mixing of the surface layer into the layer immediately below.

The aim is to obtain as short as possible a production time. For a charge thickness of the order to 5 to 10 cm, the production time is determined by the coldest point in the charge, a metallic sponge having a better homogeneity than the sponges produced by the reduction methods of the present state of the art, the latter generally having the drawback that they yield a product with varying degrees of reduction of the metallic oxides.

In this preferred form of execution, provision is made for the following:

the charging is carried out in the inner contour of the ring, the small circle, preferably over $1/6$ to $1/12$ of the width of the ring, the charge, which undergoes 4 or more complete revolutions depending on the charging conditions over the width of the ring, is turned over up to 100 times by rabbles provided with blades of different shapes and functions depending on the zone of the furnace, as described above, at each blade, the charge is moved radially outwards, the charge thus describing a roughly helical path, discharging is carried out over the outer part of the ring by means of one or more deflectors having a length corresponding respectively to the width or a fraction of the width of the charging, burners are placed in the side walls of the furnace above the hearth, mainly in the outer walls of the ring, on the large circle and/or in the outer ring of the roof, the gases are discharged by flowing in a direction opposite to that of the movement of materials through the walls on the inner sides of the ring, on the small circle.

On the rabbles, the dual-action blades with different dimensions and shapes are so arranged that the blades in the first intermediate zone progressively stir the charge at increasingly deep levels down to the hearth, while the blades of the second intermediate zone, where the charge is not yet agglomerated and is still easily mixable, have an appropriate shape different from that of the first blades and stir the furrows and their base. This prevents the appearance, on the surface of the charge, of a sheet of reduced metallic oxides that is thick, strong, difficult to break up and difficult to discharge.

These rabbles are fixed and are placed radially in the furnace, the first rabble being located in the first intermediate zone extending the charging zone, i.e. the zone in which the furnace is fed with material.

The blades of the rabbles are fixed and offset, i.e. arranged in a slightly staggered fashion with respect to the furrows formed by the blades of the preceding rabble, for example by 50 mm, so as to remove a sloping side of each furrow or saw tooth. The movement of the material on the hearth causes mixing (i.e. stirring) and the formation of a new furrow or saw tooth. The blades create furrows with a triangular cross-section over the whole of the surface of the charge, and this increases the surface area of the charge at the interface with the furnace atmosphere by an amount of the order of 20 to 65%, thus producing a greater heat transfer from the furnace to the charge.

The first and second types of dual-action blade are designed so that, at each passage through the charge, a part of it is turned over, the upper layer of the charge in contact with the furnace atmosphere, initially consisting of metallic oxides and then of the mixture of metallic oxides and coal and finally of the reduced metallic oxides, descending, while the underlying layer is raised.

The end of the blades is shaped in such a way as to turn the material over, so that the topmost part of the furrow, the hottest part, is moved to the trough of the newly created furrow in order to ensure better homogenisation.

The said end of the blades may be cooled by the internal circulation of a liquid coolant, for example.

The rabbles may be distributed linearly in the different zones of the furnace over the length of the passage in a zone of the furnace. The distribution will preferably be made non-linearly and will be dependent on the surface temperature and on the temperature gradient in the charge.

The amount of carbonaceous reducing agent is determined by the stoichiometric quantity necessary to bring about the complete reduction of the metallic oxides present, reduced by an amount corresponding to the reducing action of the volatile elements, and possibly increased by an amount necessary for melting the sponge and for subsequent alloying.

The progressive mixing of the layer of metallic oxides with the underlying layer, whose temperature is necessarily higher in the zone near to the interface between the metallic oxides and the coal than in the more distant layers, has the following consequences:

a greater heat transfer through an increase in the surface area at the interface between the upper layer and the furnace atmosphere;

the higher thermal conductivity of the layer of metallic oxides, initially present in a single layer in the upper part of the charge and afterwards progressively in the mixture, contributes to a better heat transfer than that in methods with multiple layers, without the reducing agent, in this case coal, which is a poorer conductor of heat, disturbing the process;

the progressive mixing of the layers forming the charge enables a uniformity of the temperature throughout the said charge to be rapidly achieved;

the metallic oxides very rapidly reach the high temperatures where their reactivity is greater, which increases the efficiency of the reduction process and reduces the operational time;

the volatile constituents released progressively and generated by the coal taken progressively to a higher temperature are used efficiently and directly as a reducing agent;

the reduction using hydrogen occurs immediately and is optimised, which provides a better reaction kinetics than that of CO gas;

the reduction by CO is rendered more efficient because the hotter upper layer is progressively mixed with the layer immediately below taken to an adequate temperature and not with the deepest layers that are still too cool;

in principle, it becomes possible to produce less carbon dioxide per unit mass of the reduced metal produced;

surface temperatures that are too high are avoided and hence there is no production of fayalite;

the appearance on the surface of the charge of a sheet of reduced metallic oxides that is too thick, strong, difficult to break up and difficult to discharge is prevented;

the furnace, for a given production, will be less bulky that that in other methods using rotating-hearth furnaces.

The furnace is generally maintained at a dome temperature of the order of 1300 to 1450° C., preferably of the order of 1400° C., by burners installed in the outer walls of the mobile-hearth furnace and/or in the outer ring of the roof and with post-combustion in the inner part of the ring.

The successive mixings of the upper layers with the underlying layers mean that the maximum surface temperature reached does not exceed 1100 to 1200° C.

The methods used also make it possible to increase the homogenisation of charges consisting of pellets, which contributes to a considerable increase in the thickness of the charge, to a faster and more efficient operational cycle, to a more compact furnace and to an optimisation of heat exchanges.

What is claimed is:

1. Method for the reduction of metallic oxides in a furnace with a ring-shaped rotating hearth in which a carbonaceous reducing agent and metallic oxides are deposited in a strip on a part of the said rotating hearth and are then transported in a roughly helical movement to a discharge device, the method comprising steps of:

preheating the reducing agent and the metallic oxides; and mixing the reducing agent with the metallic oxides before and/or during their deposition on the rotating hearth;

wherein, in a first reducing stage, the volatile components of the carbonaceous reducing agent are used to initiate the reduction of the metallic oxides, said volatile components comprising methane and hydrogen; and wherein, in a second reducing stage, carbon monoxide is used to reduce the metallic oxides.

2. Method according to claim 1, wherein the carbonaceous reducing agent is preheated to a temperature up to 200° C. and/or the metallic oxides are preheated to a temperature up to 850° C.

3. Method according to claim 1 or 2, wherein the carbonaceous reducing agent and/or the metallic oxides are preheated by means of the heat recovered from the combustion gas.

4. Method according to claim 1, wherein a charge of carbonaceous reducing agent and metallic oxides comprising one or more superimposed layers is deposited.

5. Method according to claim 4, wherein the superimposed layers are deposited successively.

6. Method according to claim 4, wherein the superimposed layers are deposited simultaneously.

7. Method according to any one of claims 4 to 6, wherein the layers comprise different concentrations of metallic oxides and carbonaceous reducing agent.

8. Method according to claim 7, wherein the concentration of carbonaceous reducing agent in the upper layer is less than 25% by weight.

9. Method according to claim 7, wherein the concentration of carbonaceous reducing agent in a lower layer lies between the theoretical concentration necessary for the complete reduction of the metallic oxides and a concentration of 100% by weight.

10. Method according to claim 1, wherein the mixture is heated inside the furnace up to a temperature of 950–1250° C.

11. Method according to claim 1, wherein the metallic oxides are used at a feed temperature as high as possible while avoiding the agglomeration of the metallic oxides.

12. Method according to claim 1, wherein the layer or layers of carbonaceous reducing agent and metallic oxides is/are turned over and progressively mixed during residence inside the furnace.

13. Method according to claim 1, wherein the surface of the mixture of metallic oxides and carbonaceous reducing agent is shaped by forming furrows or hummocks.

14. Method according to claim 13, wherein the slope angle of the furrows or hummocks lies between 20° and 65°.

15. Method according to claim 13, wherein a roughly sawtooth-shaped surface is created on the surface of the mixture of metallic oxides and carbonaceous reducing agent.

16. Method according to claim 14, wherein the width of the charging strip and the slope angle of the furrows or hummocks vary during the residence of the charge in the furnace.

17. Method according to claim 1, wherein the mixture is charged on to an inner part of the ring-shaped hearth, wherein it is transferred in a roughly helical movement towards the outer part of the hearth, and wherein, after the reaction, it is discharged through the outer part of the ring.

18. Method according to claim 1, wherein the mixture is discharged after four or more revolutions.

19. Method according to claim 1, wherein the layer or layers of the mixture of solid reducing agent and metallic oxides is/are deposited on a part corresponding at most to ¼ of the width of the ring.

20. Method according to claim 1, wherein post-combustion of the gases is achieved in an inner part of the ring.

21. Method according to claim 1, wherein the discharge of the gases and the movement of the charge take place radially in opposite directions.

22. Method according to claim 1, wherein the carbonaceous reducing agent and/or the metallic oxides incorporate some lime.

23. A method for reducing metallic oxides in a furnace comprising a ring-shaped rotating hearth, the method comprising steps of:

depositing a carbonaceous reducing agent and the metallic oxides in a strip on a part of the rotating hearth;

transported said strip of the carbonaceous reducing agent and the metallic oxides in a roughly helical movement to a discharge device;

preheating the carbonaceous reducing agent and the metallic oxides;

mixing the carbonaceous reducing agent with the metallic oxides to produce a mixture of the metallic oxides and the carbonaceous reducing agent;

reducing the metallic oxides in a first reducing stage using volatile components of the carbonaceous reducing agent; and reducing the metallic oxides in a second reducing stage using carbon monoxide;

wherein, said volatile components comprise methane and hydrogen.

24. The method according to claim 23, wherein the step of mixing the carbonaceous reducing agent occurs before the step of depositing a carbonaceous reducing agent.

25. The method according to claim 23, wherein the step of mixing the carbonaceous reducing agent occurs during the step of depositing a carbonaceous reducing agent.

26. The method according to claim 23, wherein the carbonaceous reducing agent and the metallic oxides deposited on the strip comprise a plurality of superimposed layers.

27. The method according to claim 26, wherein the plurality of superimposed layers are deposited successively.

28. The method according to claim 26, wherein the plurality of superimposed layers are deposited simultaneously.

29. The method according to claims 27 or 28, wherein the layers comprise different concentrations of metallic oxides and carbonaceous reducing agent.

30. The method according to claim 23, further comprising a step of:

forming furrows or hummocks on a surface of the mixture of the metallic oxides and the carbonaceous reducing agent.

31. The method according to claim 30, wherein a slope angle of the furrows or hummocks is between 20° and 65°.

* * * * *